Figure 1:
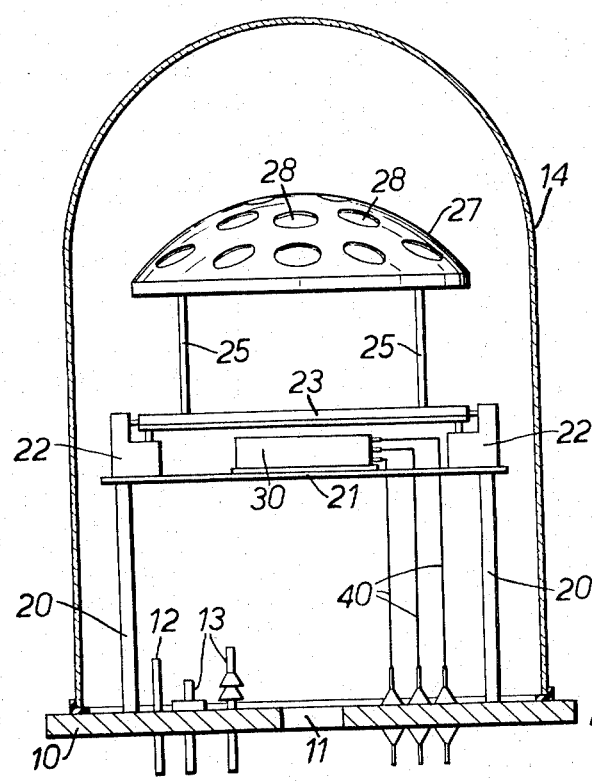

United States Patent [19]
Dobson

[11] 3,797,452
[45] Mar. 19, 1974

[54] MOTOR DRIVES FOR VACUUM DEPOSITION APPARATUS

[76] Inventor: Christopher David Dobson, 157 Linden Ct., Newbridge, Monmouthshire, England

[22] Filed: Feb. 24, 1972

[21] Appl. No.: 228,904

[30] Foreign Application Priority Data
Mar. 2, 1971  Great Britain.................5744/71
Jan. 17, 1971  Great Britain.................2146/71

[52] U.S. Cl. ................................................. 118/49
[51] Int. Cl. ......................................... C23c 13/08
[58] Field of Search .......................... 118/48–49.5; 117/106–107.2, 93–93.44, 200–233; 310/13

[56] References Cited
UNITED STATES PATENTS
| 782,312 | 2/1905 | Zehden | 310/13 |
| 2,432,950 | 12/1947 | Turner et al. | 118/49 |

FOREIGN PATENTS OR APPLICATIONS
906,712   9/1962   Great Britain.................. 310/12

Primary Examiner—Morris Kaplan
Attorney, Agent, or Firm—Geroge Vande Sande

[57] ABSTRACT

Vacuum deposition apparatus including a base (10), a vacuum vessel (14), a rotary workholder (23, 25, 27), auxiliary services (12, 13) passing through the base, and a linear induction motor (30) for driving the rotary workholder. The stator of the induction motor may be included in a sealed case (43) or it may be formed as a solid metal core (FIG. 6) without a case. Additionally a tubular induction motor (62, 63) may be provided for feeding a metal wire (61) from a spool (60) within the vacuum vessel.

9 Claims, 6 Drawing Figures

MOTOR DRIVES FOR VACUUM DEPOSITION APPARATUS

This invention relates to apparatus for use in vacuum deposition, and is concerned particularly with the problem of imparting movement to components or mechanisms within the vacuum vessel.

Various problems arise in any method of moving or actuating components within a high vacuum chamber. If a rotary or linear drive is passed through a wall of the vacuum chamber it is necessary to provide a very effective seal, and instead of conventional O-ring type rotary seals it is usual in such vacuum equipment to use a "wobble-shaft" drive, inclined from the rotary axis and passing through a flexible bellows which accordingly does not rotate but merely flexes. In this way it is possible to transmit rotary motion via a positive seal without a rotary seal but it is found in practice that flexible bellows of this type tend to fail for one reason or another after any extended period of use.

Another possible method of imparting movement to a component within the vacuum vessel is by way of a magnetic coupling including magnetic elements on opposite sides of a non-magnetic part of the wall of the vessel, such that motion of one part is accompanied by motion of the other. This type of magnetic coupling, however, has only limited applications and is often awkward to design and install.

It has also been proposed to place an electric motor within the vacuum vessel, the motor being supplied with electrical power via supply leads which pass through positive seals in the wall of the vessel. Although this may appear to solve the primary problem, in practice it is found that the motor has to be totally enclosed in a sealed casing since otherwise the high vacuum conditions result in gas being drawn off from the windings, laminations, and insulating material of the motor. It follows that a rotary seal of some type, or a sealed rotary drive, has to be provided where the motor drive passes through the motor casing. The problem therefore remains essentially the same: to provide an effective drive through the wall of a vacuum vessel into the interior. Also any rotary motor inevitably requires bearings, which can lead to further problems in high vacuum conditions.

Now from one aspect the invention consists in apparatus for use in vacuum deposition comprising a supporting structure to be contained within the vacuum vessel during the deposition period, and means for moving or actuating a mechanism or component within the vessel, comprising a linear induction motor.

The term "linear" as used herein is to be understood to refer to this general class of motor, and not to be limited only to strictly linear movement. Although true linear motion or reciprocation may be produced in some cases, the output motion produced by the motor will in many cases be of a rotary type; for example the moving part of the linear motor may be a relatively large radius ring or disc.

From another aspect the invention consists in a vacuum deposition vessel, including a rotary workpiece support or carriage, and a linear induction motor within the vessel, for rotating the carriage while deposition takes place.

From yet another aspect the invention consists in apparatus for use in supporting workpieces within a vacuum vessel, for vacuum deposition purposes, comprising a mounting structure connected or connectable to a base part of the vessel, a rotary structure or carriage having means for mounting one or more workpieces and itself mounted for pivotal movement on the mounting structure, and a linear induction motor within the vessel, arranged to cooperate with a part of the rotary carriage to cause rotational movement thereof.

The invention can also be applied to a motor or driving system for any elongated element to be fed forwardly within the vessel, such as a wire feed device. Thus from yet another aspect the invention consists in apparatus for use in vacuum deposition, including a wire feed device for supplying a metal wire to the evaporative source, the feed device comprising a tubular linear induction motor.

The linear motor may be of various types but conveniently, at least in the case of a drive for a rotary carriage, the motor is of the "short-stator" type i.e., the static part of the motor is relatively short in length, and carries the current windings, and the moving element is relatively long, and has no current windings.

In any case the windings and laminations of the motor are preferably totally enclosed in a sealing envelope, which will preferably be formed of a non-magnetic material such as stainless steel. The electric supply leads will pass through this envelope but no moving parts are required and the envelope can therefore be positively and totally enclosed.

In a preferred construction according to the invention the apparatus includes a movable metallic hoop, ring, or plate, forming part of the structure or mechanism within the vessel and designed to cooperate with the stator part of the motor to create the desired movement.

Figure 2:
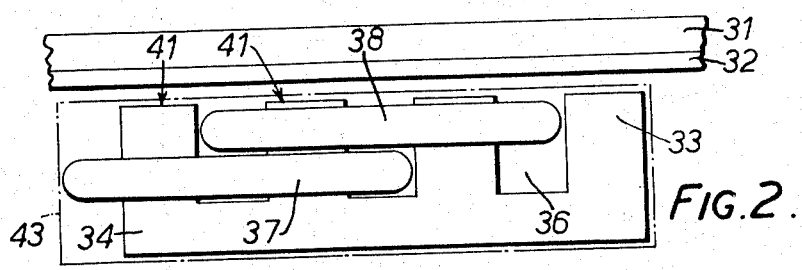
Figure 3:
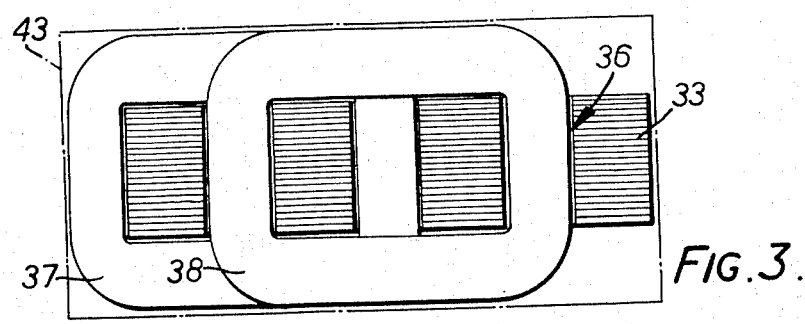
Figure 4:
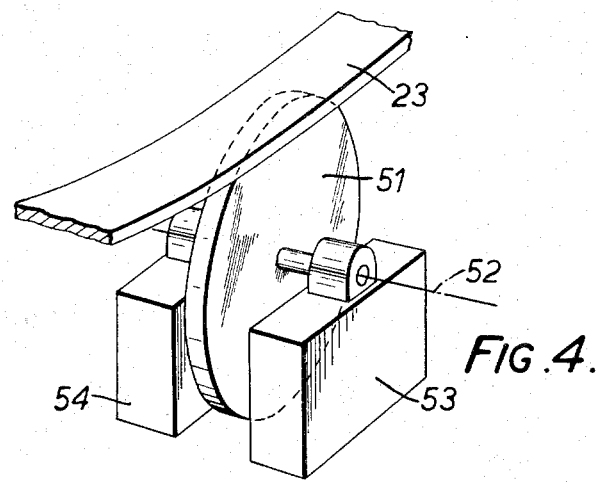

The invention may be performed in various ways and a number of specific embodiments will now be described by way of example, with reference to the accompanying drawings, in which:

FIG. 1 is a sectional side elevation through one form of vacuum deposition apparatus including a linear motor for moving a rotary workpiece holder, FIG. 2 is a diagrammatic side elevation, on an enlarged scale, of the linear induction motor, FIG. 3 is a diagrammatic plan view of the stator part of the induction motor, FIG. 4 is a diagrammatic perspective view, on an enlarged scale, of an alternative type of linear induction motor for driving the rotary workholder.

Figure 5:
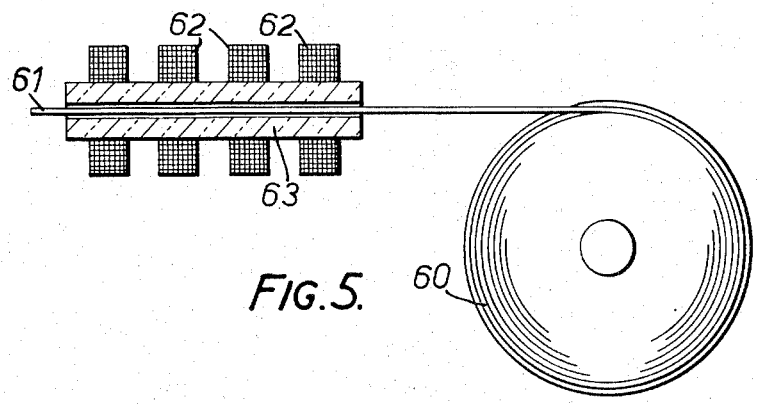
Figure 6:
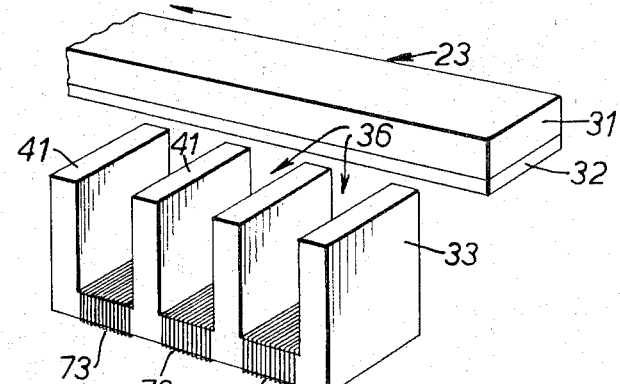

FIG. 5 is a diagrammatic sectional view illustrating a linear induction motor for feeding a metal wire within the vacuum vessel, and FIG. 6 is a diagrammatic perspective view illustrating another form of linear induction motor for driving the workholder.

In the first example the invention is applied to a vacuum deposition apparatus designed for applying metallic coatings by vacuum deposition onto small circular substrates, for use in optical or semi-conductor applications. The apparatus comprises a heavy metal base plate 10 having a central aperture 11 for connection to the normal vacuum pumps, and a number of hermetically sealed service connections such as gas supply and return lines 12, electrical high tension and low tension supply terminals 13, heating and cooling connections, metering, indicating or recording connections etc. Attached to this base-plate is a fixed structure extending upwards into the interior of the vacuum jar 14, which is placed over the base-plate to form a seal therewith when the apparatus is in use. This supporting structure is designed to support and locate the substrates or other workpieces to be coated, and in the present example the structure comprises a stationary framework and a moving framework, the stationary framework including three upright pillars or columns 20 supporting a horizontal ring 21 on which are mounted three angularly spaced rollers or bearings 22 supporting another horizontal ring 23 which can thus rotate about the main vertical axis of the base-plate. This second ring has three equally spaced vertical legs 25 attached to an upper part-spherical work-holder 27 having a number of apertures in which the substrate discs or "slices" 28 are located for the deposition process. The metal evaporating source (not illustrated) is usually a small "boat" or crucible positioned centrally, and approximately at the same horizontal level as the ring 21. Heater current is applied to the "boat" to cause the metal to evaporate in the high vacuum conditions and so form the required coating on the exposed surfaces of the substrates 28.

In this example of the invention the whole rotary workholder support 23, 25, 27, is caused to rotate slowly about its vertical axis by a linear induction motor indicated at 30. For this purpose the upper horizontal ring 23, which is in fact part of the rotary workholder itself, is formed of two metal laminations 31,32, (see FIG. 2). The lower lamination 32 is a thin copper ring and the upper lamination 31 is a somewhat thicker magnetic iron ring, the two being closely bonded or brazed together. This composite ring 23 acts as the moving element of the linear induction motor. The other part of the motor is mounted on the lower static horizontal ring 21 of the mounting structure, and comprises a laminated core body 23 extending a short distance around the arc of this ring 21 or in a straight line, and having a number of notches 36 in its upper surface, extending across the length of the core, a number of multi-turn conducting loops 37,38 being positioned in these notches or slots, and insulated from the laminations of the core 33 in normal electric motor practice, such that when alternate loops or windings are connected to a multi-phase supply (see 40 in FIG. 1) the tips of the laminations between the slots 36 act as pole pieces and create in effect a "cycling" or advancing magnetic field. The whole of this stator part of the motor, including particularly the laminated core 33 and coil windings 37,38, with their insulating coatings, are contained within a non-magnetic sealed envelope or case indicated diagrammatically at 43, which may be conveniently formed of stainless steel. The electrical supply leads 40 to the windings are passed through the case 43 and provided with positive seals so that there is little or no chance of any gases escaping from this stator unit under the very high vacuum conditions. The other element of the motor, i.e., the actual moving ring 23 of the upper workholder support structure, is a plain metallic component and does not require to be enclosed.

The apparatus as described provides a particularly convenient method of causing the rotary workholder (23,25,27) to turn about its central axis, and avoids any necessity for a moving rotary seal passing through a wall of the vacuum vessel itself or through the wall of a casing surrounding the electric motor. The motor has no bearings and there is no contact between the stator 33 and the other moving element 23.

In a possible modification as illustrated in FIG. 4 the horizontal hoop or ring 23 forming the lower part of the rotary workholder is not itself an integral component in the induction motor but is arranged to engage frictionally with a small metallic magnetisable driving disc or wheel 51 carried by the lower supporting hoop 21 on a horizontal radial axis 52. In this example the periphery of the small driving wheel 51 acts as the moving part of a linear induction motor, which comprises a pair of laminated slotted core or stator structures 53,54 each provided with conducting loops as described above with reference to FIGS. 2 and 3, and positioned one on each side of the driving wheel such that when multi-phase current is supplied to the windings the wheel 5 is caused to rotate and so to drive the horizontal ring or hoop 23 by friction. By using a pair of such laminated slotted stators on opposite sides of the driving wheel adjacent to its periphery the driving torque is increased. Here again the stator or stators including the laminations and conductor windings will be totally hermetically enclosed and sealed in non-magnetic casings, formed preferably of stainless steel.

In another example of the invention illustrated diagrammatically in FIG. 5, the principle is applied to the drive of a feed device supplying a make-up wire 61 from a spool 60 within the vacuum vessel to the boat or crucible in which the metal is heated to act as the evaporating source. In this case a tubular type of induction motor is employed comprising a series of helical windings 62 around a tubular non-magnetic sheath 63 which may, for example, be a ceramic material. The windings and the core on which they are positioned are arranged to provide a series of spaced internal teeth or pole pieces such that when the different windings are connected to a multi-phase supply a cycling or stepping magnetic field is produced within the tube. This field reacts with the conductive magnetic material of the wire 61 feed to cause the feed wire to move progressively through the tube, in known manner.

The linear induction motor illustrated in FIG. 6 is in many respects similar to that illustrated in FIGS. 2 and 3, and similar parts are indicated by the same reference numerals. In this example the stator core 33 is not laminated, but is formed as a solid metallic body in a magnetic flux-conducting material such as soft iron. Also instead of current loops around the teeth of the core, there are multi-turn windings 73 around the base part of the core between the teeth 41. These windings 73 are formed of anodised aluminium wire, the anodised surface acting as an electrical insulation. Since there are no laminations in the core, eddy currents will be produced in the metal body 33, and the metal will be heated more than is usually desirable in an electric motor. However, the absence of laminations avoids the need for insulating coatings or varnish on the laminations, and therefore there is no "gassing" or evaporation which would disturb the clean vacuum conditions. Similarly the anodised surface on the aluminium wire avoids any "gassing" when the wire is heated. With this construction therefore it is unnecessary to provide a casing (such as 43 in FIGS. 1 and 2) encosing the stator part of the motor.

I claim:

1. Apparatus for use in vacuum deposition comprising, a vacuum chamber, driving means within said chamber comprising a motor, said motor being a linear induction motor and comprising a statically mounted stator cooperating with a movable armature, and means for preventing outgassing from said stator.

2. Apparatus according to claim 1, wherein a rotary work supporting structure is also mounted within said chamber, said movable armature of said linear induction motor being effective to rotate said structure.

3. Apparatus according to claim 2, wherein a part of said rotary structure constitutes the armature of said linear induction motor.

4. Apparatus according to claim 2, wherein said rotary structure includes a rotatable metallic circular member constituting the movable armature and cooperating with the stator of said linear induction motor to rotate said structure.

5. Apparatus according to claim 1, wherein said linear motor is of the "short stator" type, the length of said stator being substantially less than the effective length of said movable armature.

6. Apparatus according to claim 1, wherein said last-mentioned means comprises a non-magnetic casing totally enclosing said stator to prevent outgassing from said stator into the vacuum chamber.

7. Apparatus according to claim 6, wherein said sealed casing is formed of a non-magnetic material, such as stainless steel.

8. Apparatus according to claim 1 wherein said stator comprises a solid body of ferro magnetic material without laminations supporting at least one winding and said last-named means comprises a coating of an inorganic refractory insulating material on said winding.

9. Apparatus according to claim 8, wherein said winding is formed of anodixed aluminium wire.

* * * * *

UNITED STATES PATENT OFFICE
CERTIFICATE OF CORRECTION

Patent No. 3,797,452          Dated March 19, 1974

Inventor(s) CHRISTOPHER DAVID DOBSON

It is certified that error appears in the above-identified patent and that said Letters Patent are hereby corrected as shown below:

In the Foreign Application Priority Data that portion reading

Jan. 17, 1971  Great Britain. . . . .2146/71 should read

Jan. 17, 1972  Great Britain. . . . .2146/72

Signed and sealed this 30th day of July 1974.

(SEAL)
Attest:

McCOY M. GIBSON, JR.
Attesting Officer

C. MARSHALL DANN
Commissioner of Patents